United States Patent Office 2,876,122
Patented Mar. 3, 1959

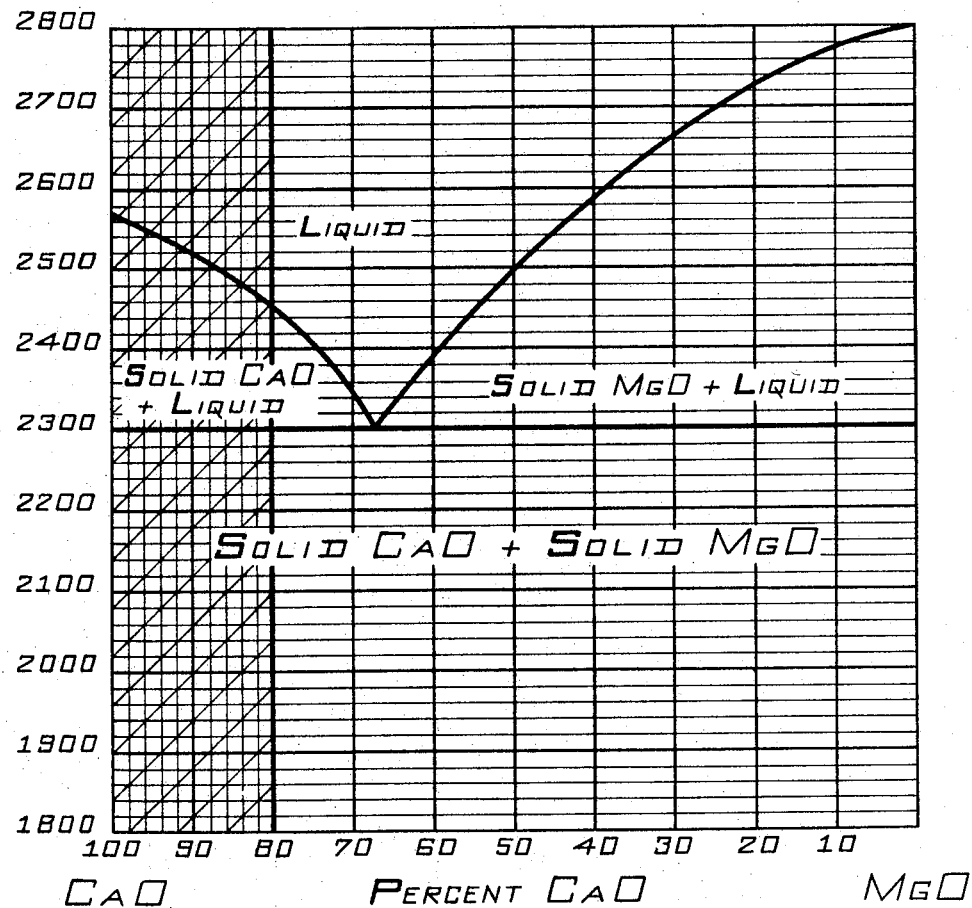

2,876,122

CALCIUM OXIDE ARTICLES AND METHOD OF MAKING THE SAME

Osgood J. Whittemore, Jr., Princeton, Mass., assignor to Norton Company, Worcester, Mass., a corporation of Massachusetts Application August 26, 1953, Serial No. 376,633

2 Claims. (Cl. 106—63)

The invention relates to calcium oxide articles and method of making the same.

One object of the invention is to provide superior crucibles for iron and steel and other metals. Another object of the invention is to provide basic refractory shapes for furnace linings. Another object of the invention is to provide investment material for making molds for precision castings. Another object of the invention is to provide refractory molds and cores which are capable of withstanding very high temperatures and which can readily be removed to free the castings. Another object of the invention is to provide highly basic crucibles and containers for metallurgical research and for practical use in refining metals.

Other objects will be in part obvious or in part pointed out hereinafter.

The drawing is a graph of the system CaO—MgO modified from a graph in the Journal of the American Chemical Society, volume 38, page 571 (1916).

My refractory articles and shapes are made of lime which can be pure lime or can contain up to 20% magnesia, but I limit the silica content to not more than 3%. Furthermore the products should contain not more than one half of one percent of material other than oxide (including silicate) and not more than two percent of oxide other than lime, magnesia and the limited amount of $SiO_2$ permissible. It is understood that the silica, if any, can be present as a discrete compound or as a silicate of the lime or magnesium.

Lime hydrates readily in the presence of water vapor which results in the eventual complete collapse of any shape made of the material if it is subjected to water vapor. Previous research, therefore, has attempted to stabilize the lime from hydration by adding other oxides or minerals. This research approach is wrong if the ultimate end is to obtain a refractory with a high melting point. Eutectics of lime with other oxides melt at low temperatures, that is with silica at 1436° C., with $Fe_2O_3$ at 1200° C., with alumina at 1400° C.

I have found that I can make lime, calcium oxide, CaO, refractories by first fusing the lime, then crushing the resulting ingot to obtain particles, then molding a mass of the particles using a temporary binder, and finally firing the molded shapes at cone 16 conditions which usually involve a top temperature of about 1450° C. It is surprising that lime, CaO, without any bonding material can thus be vitrified in view of the fact that the melting point of pure lime is 2570° C. To be sure I often fire the shapes at higher temperatures but naturally it is more economical to fire at lower temperatures and lower cones. If the proposed use of this article subjects it to great mechanical stresses at high temperatures, it may be preferable to vitrify at cone 35 but if the mechanical stresses are not going to be great such as where the material is used for a mold or a crucible or the like, heating to above the original firing temperature will merely still further vitrify the mass and hence it is sufficient to fire at, for example, cone 16. But I can fire the shapes under conditions as low as pyrometric cone 12 provided the shapes ultimately reach at least 1200° C.

The firing can be described as a sintering operation since the particles of lime are sintered together without melting. No mechanical pressure is necessary during the firing. However, the shapes are either tamped with an air gun or molded under pressure; I use pressures of at least 1000 pounds per square inch and prefer about 5000 pounds per square inch of pressure. The tamping gives a density equivalent to the use of at least 1000 pounds per square inch of pressure.

It is surprising that articles made in this way can withstand climatic conditions of the summertime in Massachusetts for as long as two weeks without deterioration. Naturally articles made in accordance with this invention should be kept in closed containers or carefully wrapped in metal foil. Also it is quite practical to dip the articles in wax or to spray them with various organic materials. In that way they can be kept without deterioration for indefinite periods of time.

However a great advantage of my invention lies in the fact that, if it is embodied in intricate molds or cores, these can be readily removed from a casting merely by the use of water. Water will quickly disintegrate the mold or core or other shape.

It is possible to have significant amounts of magnesia without lowering the melting point to a low value. The drawing shows the system CaO—MgO and it can be seen that the lowest melting mixture, 67% CaO and 33% MgO, melts at about 2300° C. On cooling any molten mixture of CaO and MgO, crystals are formed: at first either lime or magnesia crystals and eventually both. Lime and magnesia do not form solid solutions of the one in the other.

The effect of the very small amounts of other permissible impurities would be to depress the melting point even more if large amounts of magnesia were present. In addition, it is known that the vapor pressure of magnesia is high above 2200° C. while the vapor pressure of lime at this temperature is much lower. In addition, the coefficient of thermal expansion for fused magnesia is higher than for fused lime. I have determined these values from room temperature to 1500° C. as follows: fused lime— $143 \times 10^{-7}$ in./in./° C.; fused magnesia—$160 \times 10^{-7}$ in./in./° C.

I prefer not to have more than 20% of magnesia present. The mixture of 80% pure CaO and 20% pure MgO has a liquidus point of about 2460° C. and a solidus point of 2300° C. as seen in the drawing in which the cross hatched area represents the composition according to the invention. My composition, having regard for any $SiO_2$ and other material should have a liquidus point above 2400° C.

Ores which can be used for my process and to obtain the articles described herein are widespread over the earth's surface; calcite, magnesite and dolomite are respectively calcium carbonate, magnesium carbonate and mixtures of these carbonates. I can use calcareous dolomite, that is to say dolomite which is rich in lime content. It is customary "to dead burn" the ores before fusion. Such calcining drives off the carbon dioxide content leaving essentially CaO or MgO or mixtures thereof. Such material is then fed into an electric furnace, such as for example the furnace described in U. S. patent to Aldus C. Higgins, No. 775,654, November 22, 1904. Naturally mixtures of dead burned calcite and dead burned magnesite can be used. These materials are readily available in the purity specified herein and hence no reaction need take place in the electric furnace. The fusion in the electric furance simply melts the oxide or combination of oxides which is then allowed to cool to produce an ingot which is then crushed in manners well known in the refractory and abrasive arts. Naturally if the crushing operation introduces a content of iron it may be desirable to use magnetic separators to remove the iron. Particle size of the grits or grain or powder used to produce the articles according to my invention is not critical. The technique of selection of a range of grit size to produce dense articles is now well known. Naturally the texture of the final articles will vary depending upon the coarseness or fineness of the particles and proportion of coarse particles to fine particles.

*Example I*

A dead burned lime was fused in the electric furnace and was then crushed and yielded material of the following chemical analysis:

TABLE I

| | Percentage by weight |
|---|---|
| CaO | 98.8 |
| $SiO_2$ | 0.56 |
| $Fe_2O_3$ | 0.52 |
| Ignition loss | 0.12 |

This material was crushed to pass a 46 mesh sieve and then the following batch was mixed:

TABLE II

| | | |
|---|---|---|
| Fused lime, through 46 mesh | pounds | 10 |
| Kerosene | cubic centimeters | 300 |

This mixture was tamped into a steel crucible mold to produce a lime crucible which was then removed and set in a warm kiln where the kerosene evaporated. The kiln was then fired to 1750° C. which temperature was held for three hours. After firing the crucible was strong, dense and smooth. The inside diameter of the crucible made was three and one-eighth inches, the outside diameter was nine and one-half inches, and the thickness of the bottom was one-half inch, and the altitude was nine and five-eighths inches. Before firing, the green article was set on a fused magnesia refractory plate in the kiln.

*Example II*

The lime of Example I analyzing, after firing in the electric furnace, as shown in Table I was crushed and screened through a 24 mesh sieve. The following batch was mixed:

TABLE III

| | | |
|---|---|---|
| Fused lime, through 24 mesh | pounds | 50 |
| A solution of cellulose acetate in methylethyl ketone in the proportion of one gram of the acetate to six cc. of the ketone | cubic centimeters | 1500 |

This mixture was tamped into four different steel molds to produce ten crucibles having inside diameters running from one inch to eight inches, having wall thicknesses from one-quarter inch to one-half inch and with altitudes varying from three inches to twelve inches, the shapes of the crucibles being roughly similar. Also I used this mixture to make four bricks nine inches by two and one-quarter inches by one inch, the bricks having been made by pressing in steel molds at 5000 pounds per square inch. These articles were set in a dryer and dried at 170° F. for two hours. Then they were removed and set on magnesia plates in a kiln and fired to 1425° C. for five hours. The crucibles and the bricks were strong, dense and smooth. Several of these articles lasted over two weeks in the open in a factory room before crumbling. The time of year was July and the place was Worcester, Massachusetts. I have found that I can keep articles so made in steel cans with covers for months and so far as I know even for years, but the years have not yet elapsed.

In the fused lime which I use the crystals are mostly the size of the particles, that is, one particle is one crystal, whereas the dead-burned calcite consists of particles most of which include many crystals. The resultant shapes made according to this invention out of fused lime have large crystals exposing a relatively low total area for hydration as compared with shapes which might be made out of the merely dead-burned calcite or dolomite or mixtures of the dead-burned calcite and dead-burned magnesite. Shrinkage would be great in the manufacture of articles out of the dead-burned material whereas shrinkage is within reason when making articles out of the fused material. Furthermore, by using the fused material I can make denser articles than I could if I used the dead-burned material. For many uses articles made out of the dead-burned material would be quite unsatisfactory. I am not implying that any great quantity of articles ever were made out of the dead-burned material though I believe some shapes have been made in graphite molds and used in the molds, that is to say they were not stripped from the molds for use but left therein, the graphite having given them a certain amount of protection and strength. My articles, however, have strength adequate for the uses pointed out herein and need no such protection as mentioned above; it is simple enough to keep them in closed cans and they can be used over and over again if they are returned to the cans after use. Exposure for a few hours to the atmosphere will in nowise affect them.

It will thus be seen that there has been provided by this invention calcium oxide articles and method of making the same in which the various objects hereinabove set forth together with many thoroughly practical advantages are successfully achieved. As many possible embodiments may be made of the above invention and as many changes might be made in the embodiments above set forth, it is to be understood that all matter hereinbefore set forth or shown in the accompanying drawing is to be interpreted as illustrative and not in a limiting sense.

I claim:

1. A refractory article having a liquidus point of at least 2400° C. and being a shaped piece of relatively dense characteristics formed by compacting and sintering fused lime (CaO) particles containing not more than 20% fused magnesia, not more than 3% fused silica, not more than 2% of oxide other than said lime, magnesia and silica, and not more than one-half of one percent of material other than oxide, the sintered fused lime being crystalline material the particles of which are predominantly monocrystalline exposing a relatively low area for hydration, the entire content of the article other than said magnesia, silica, other oxide and other material being lime CaO, the article being relatively stable in storage and use.

2. Method of making a sintered refractory lime article having a liquidus point of at least 2400° C. comprising compacting in a mold under a pressure of at least 1000 pounds per square inch particles which are predominantly monocrystalline particles of sizes selected to produce a dense article, the particles being of fused lime (CaO) containing not more than 20% fused magnesia, not more than 3% fused silica, not more than 2% of oxide other than said lime, magnesia and silica, and not more than one-half of one percent of material other than oxide, and thereafter sintering by firing the article throughout to a temperature of at least 1200° C., the entire content of the particles other than said magnesia, silica, other oxide and other material being lime (CaO) and the entire content as a sintered article having a liquidus point of at least 2400° C.

(References on following page)

References Cited in the file of this patent

UNITED STATES PATENTS

| | | |
|---|---|---|
| 266,145 | Henderson | Oct. 17, 1882 |
| 2,076,883 | Ernould | Apr. 13, 1937 |
| 2,285,020 | Douglas et al. | June 2, 1942 |
| 2,567,077 | Moon | Sept. 4, 1951 |

FOREIGN PATENTS

| | | |
|---|---|---|
| 1,491 | Great Britain | 1901 |

OTHER REFERENCES

A. B. Searle, Refractory Material, second edition (London, 1924) pages 398 and 399.

American Chemical Society: Journal, v. 38, pp. 570–571 (1916).